(No Model.) 3 Sheets—Sheet 1.
F. W. HILLARD.
TYPE WRITING MACHINE.

No. 554,874. Patented Feb. 18, 1896.

Witnesses:
Samuel W. Balch
Willard P. Shaw

Inventor,
Frederic W. Hillard,
by Thomas Ewing Jr.
Attorney.

(No Model.) 3 Sheets—Sheet 2.

F. W. HILLARD.
TYPE WRITING MACHINE.

No. 554,874. Patented Feb. 18, 1896.

Witnesses:
Samuel W. Balch
Willard P. Shaw

Inventor,
Frederic W. Hillard,
by Thomas Ewing Jr.
Attorney

(No Model.)  
3 Sheets—Sheet 3.

F. W. HILLARD.
TYPE WRITING MACHINE.

No. 554,874.  
Patented Feb. 18, 1896.

Witnesses:  
Samuel W. Balch  
Willord P. Shaw

Inventor,  
Frederic W. Hillard,  
by Thomas Ewing Jr.  
Attorney

ANDREW B.GRAHAM, PHOTO-LITHO, WASHINGTON, D.C.

UNITED STATES PATENT OFFICE.

FREDERIC W. HILLARD, OF TOTTENVILLE, NEW YORK.

TYPE-WRITING MACHINE.

SPECIFICATION forming part of Letters Patent No. 554,874, dated February 18, 1896.

Application filed May 13, 1892. Renewed November 21, 1894. Serial No. 529,465. (No model.)

*To all whom it may concern:*

Be it known that I, FREDERIC W. HILLARD, a citizen of the United States of America, residing at Tottenville, Richmond county, New York, have invented certain new and useful Improvements in Type-Writing Machines, of which the following is a specification.

My invention is an improvement in typewriter escapements, its aim being to attain a uniform and certain feed at high speed.

The escapements of type-writers as now made operate as follows: First, the rack engages with the spacing-dog while the machine is at rest, and the carriage feeds forward after the stroke is finished and the key has been released. Such escapements are slow, because time must be allowed between two strokes for the carriage to start and feed a whole space. Or, second, the rack engages with the detaining-dog while the machine is at rest, and the carriage feeds forward during the stroke. Such escapements are rapid; but, as the paper is in full motion at the instant of printing, if the type rebounds and strikes the paper more than once supernumerary impressions, known as "ghosts," will be printed. Or, third, the carriage is let off and feeds on each downward and upward movement of the key, feeding each time a half-space.

My invention consists essentially of an escapement in which the members may be first thrown out of and then again into engagement by the key during its downstroke, so that the carriage is let off near the end of the stroke—*i. e.*, just before, or just after, or just at the instant of printing—and is spaced forward during the return of the key by which it is let off and during the earlier part of the next succeeding stroke. The let-off herein disclosed can be so nicely regulated that the carriage is not moving sufficiently at the instant of printing to cause ghosts if the type rebounds, and yet sufficient time is allowed to secure accurate spacing.

My invention also comprises broadly means for camming or retracting the carriage, so as to control the feed of the carriage after the let-off has taken place.

In the accompanying drawings, which form a part of this specification, the general form of machine shown is the Remington typewriter, though several forms of feeding and escapement mechanism not used on the Remington machine are illustrated.

Fig. 14 is a back view of this modification. Fig. 15 is a detail of the spacing-dog of Fig. 14. Fig. 16 illustrates a modification in which the carriage is fed forward by the spring which actuates the dog and the carriage-mainspring is dispensed with. Fig. 19 is a detail showing an adaptation of the invention to an escapement in which the rack is spaced by the impact of the dog.

In the form shown in Figs. 1 to 4 the rack is normally in engagement with the spacing-dog. When the key is depressed the spacing-dog passes out of mesh and spaces and the detaining-dog comes into engagement with the rack. During this time the carriage remains stationary, but the rack is suspended so that it is free to swing on friction-pivots abutting against its ends and near its upper edge, and on the rocker-frame is an arm carrying an adjustable point which, when the rocker-frame has swung far enough to free the spacing-dog from the rack, strikes the rack intermediately between the line of the pivots and the line of the teeth and pushes it with a speed at the line of its teeth considerably greater than the speed of the dog over onto the spacing-dog. The carriage then spaces forward when the key is released, and the rack and dogs return to their normal positions along with the rocker-frame.

The parts shown in Figs. 1 to 4 are as follows: To the frame 1 are attached the key-levers 2, which operate the rocker-frame 3 through a universal bar (not shown) by links 4 4, which connect the universal bar to the horizontal bar 5, attached to the rocker-frame. The rocker-frame is swung in toward the front of the machine on depression of a key and is returned to its original position, when the key is released, by a spring 6, attached to the frame. All of these parts operate in the usual manner and are of the usual form. On the rocker-frame and engaging with the rack 7 are the spacing-dog 8 and the detaining-dog 9. The spacing-dog may be operated by a spring in the usual manner to space it back into position to engage with the next succeeding tooth when released from the rack; but I prefer the form shown, in which the spacing-dog on being released from the rack is spaced back by engagement with a cam, as will be hereinafter more fully described.

Figure 1:
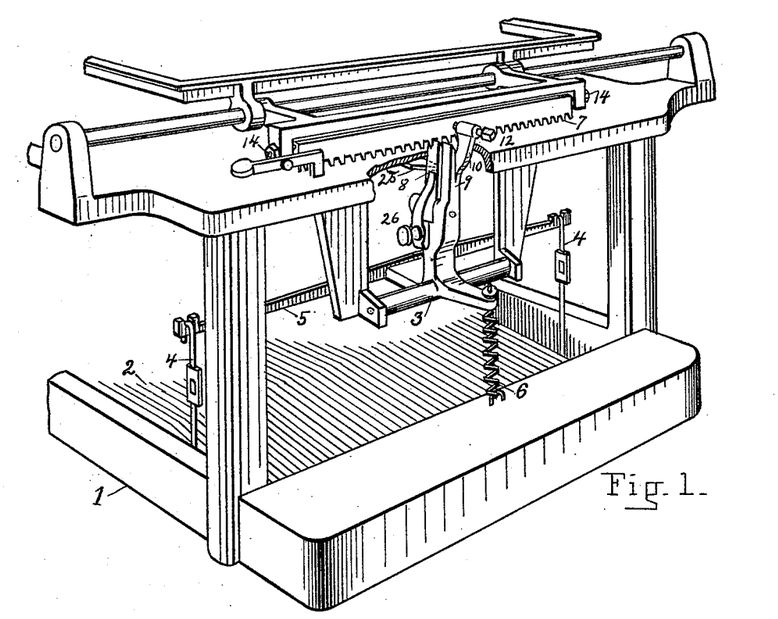
Figure 1 is a perspective view of the rear part of the type-writer, seen from behind.
Figure 2:
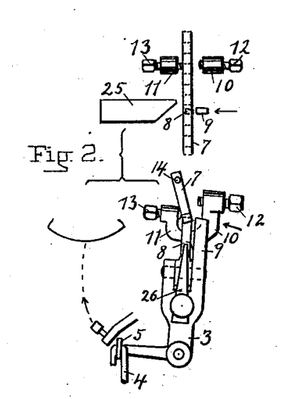
Figs. 2, 3, and 4 are each a top and side view showing the positions of the operative parts of the escapement and the corresponding position of the type-bar, first, as the type-bar begins to ascend; second, when it is about in the middle of its ascent, and, third, just after its stroke.
Figure 3:
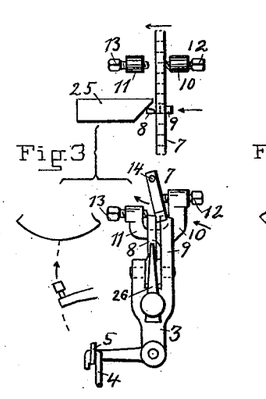
Figure 4:
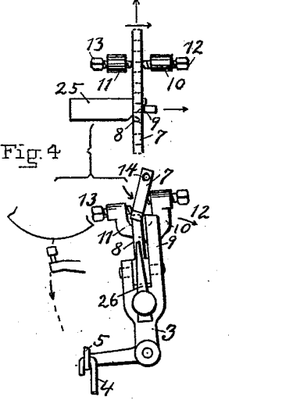
Figure 5:
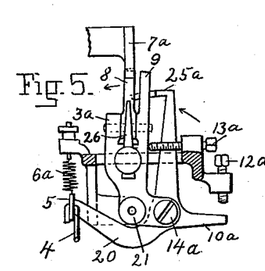
Figs. 5, 6, and 7 show a modified escapement in substantially the same positions as Figs. 2, 3, and 4.
Figure 6:
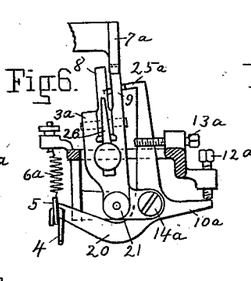
Figure 7:
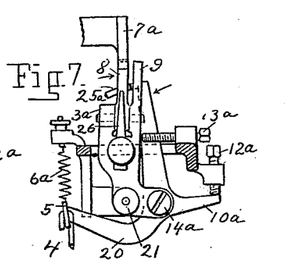

On the upper end of the rocker-frame are two arms 10 11, which carry screws 12 13, the points of which lie, respectively, above the detaining-dog and the spacing-dog. The screw 12 engages the rack on a line about half-way between the line of its pivots 14 and the line of its teeth, as is shown in Figs. 3 and 4. This screw, which is adjustable, engages the rack only after the spacing-dog has left the rack and has been thrown backward through a part of one space. When engaged by this screw the rack at the line of its teeth travels inward about twice as fast as the dogs, and is hence pushed off from the detaining-dog and onto the spacing-dog, overtaking the same after the spacing-dog has moved back one space. This position is shown in Fig. 4. By a slight change in the adjustment of the screw 12, or of the length of the links 4 4, or in the depth to which the connection with the type-bars will permit the type-key levers to be depressed, the position of the parts shown in Fig. 4 may be made to correspond with the instant of the stroke of the type on the platen, or the instant just preceding or just following the stroke; and as the type-keys may not be uniformly adjusted different keys may let off the platen at different times relative to the impact of the type.

The screw 13 engages the rack on the line of its teeth and returns the rack with the rocker-frame from the position of Fig. 4 to that of Fig. 1.

Figure 9:
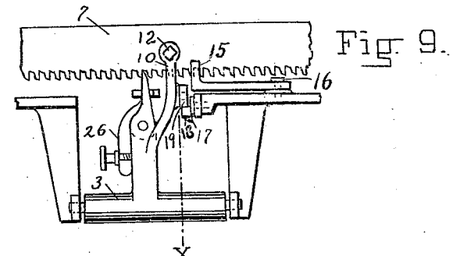
Figs. 9 and 10 are respectively side and back views of an escapement like that of Fig. 1, except that a lock is substituted for a friction-joint in the rack.
Figure 10:
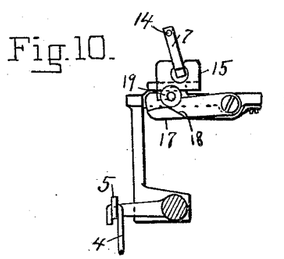
Figure 11:
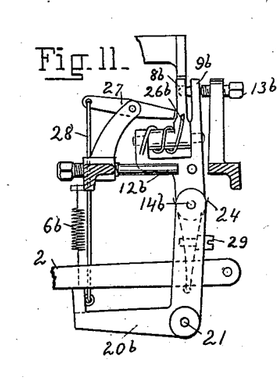
Figs. 11, 12, and 13 show a second modified escapement in substantially the same positions as Figs. 2, 3, and 4.
Figure 12:
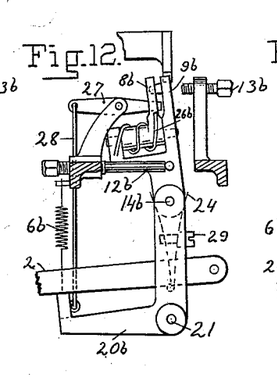
Figure 13:
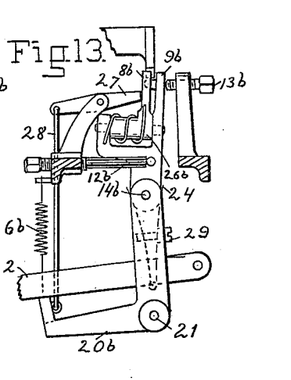

Until pushed by the screw 12 the rack is prevented from swinging with the rocker-frame by the friction at the pivots 14, which friction must therefore be greater than the friction between the dogs and rack; but instead of relying on this friction I may use a lock 15 to hold the rack, as shown in Figs. 9 and 10. Fig. 9 is to be interpreted by Fig. 3 as to the parts shown to the left of the section-line X and by Fig. 10 as to the parts to the right of this section-line. The rack is normally held by the lock 15, which is on the end of an arm attached to the frame by a pivot 16, the lock being held by a pivoted latch 17 on the side of a cam 18, on which a wheel 19, attached to the rocker-frame, runs as the rocker-frame is thrown forward. This wheel depresses the latch and thus unlocks the rack, so that it can swing as soon as the spacing-dog is out of engagement with it and before the screw on the rocker-frame above the detaining-dog comes into engagement with it to push it inward into engagement with the spacing-dog.

In the form shown in Figs. 5 to 8 the rack is fixed and the rocker-frame is made of two distinct parts jointed together. When the rocker-frame is oscillated on depression of a key the two parts swing together far enough to throw the spacing-dog out of mesh and the detaining-dog into mesh with the rack and to move the spacing-dog back one space. One part of the rocker-frame then contacts with a stop and the movement of the dogs is reversed. The spacing-dog returns to mesh with the rack in the next succeeding tooth and is carried with the rack forward into line with the detaining-dog. The two parts of the rocker-frame assume their normal relative positions at their common joint when the key is released.

The parts shown in Figs. 5 to 8 are as follows: The keys operate the rocker-frame through a universal bar (not shown) by links 4 4, which connect the universal bar to the horizontal bar 5, attached to the rocker-frame. The rocker-frame is swung in toward the front of the machine on depression of a key, and finally resumes its original position on release of the key, under the influence of a spring attached to the frame of the machine, as before described.

The description and discussion of the dogs given in describing the form shown in Figs. 1 to 4 applies equally to the form shown in Figs. 5 to 8.

The rocker-frame is composed of two parts united by a friction-joint $14^a$. The main part $3^a$ of the rocker-frame, which is pivoted directly to the frame of the machine, carries the two dogs. The other part, which is pivoted to the main part, has three branches, one, 20, attached to or otherwise operated in connection with the horizontal bar 5. Another, $10^a$, extends horizontally to the right in Figs. 5, 6, and 7 under a fixed but adjustable stop-screw $12^a$, set in the machine-frame. The third, extending upward, carries a cam $25^a$ like the one attached to the frame of the machine in Figs. 1 to 4, which contacts with the front face of the spacing-dog when in position shown in Figs. 6 and 7. When the universal bar is depressed, the entire rocker-frame first oscillates about the pivot 21, by which it is supported on the machine-frame, carrying the spacing-dog out of and the detaining-dog into mesh with the rack, and also bringing the end of the branch 10ª into contact with the stop-screw 12ª. While this contact is established, the three-branched arm turns about the point of contact as a center, the two parts of the rocker-frame buckle at their friction-joint 14ª, and the main part 3ª which carries the dogs, is reversed on its pivot and swings back. The spacing-dog is thrown back into engagement with the rack at the succeeding tooth and moves ahead with the rack and carriage after the key is released. When the key is released, the parts of the rocker-frame are returned by a spring 6ª from the position of Fig. 7 to that of Fig. 5, which is the normal relative position of the parts at their joint.

In the form shown in Figs. 11 to 15 the operation is essentially the same as that of Figs. 5 to 8. The mechanism differs, however. On the rocker-frame are two horizontal arms, 20$^b$, which extend out under the universal bar. These two arms are connected by a cross-beam 22, supported on pivots 21, set in the frame of the machine. Two vertical arms, 23, rise from the ends of the cross-beam and support between them on pivots 14$^b$ a second cross-beam, which carries the dogs. This second cross-beam may be sustained on a friction-joint; but I have shown the friction which controls the movements of this beam applied by a pair of springs 24, the pressure of which is regulated by a screw 29. The stops 12$^b$ 13$^b$ have the function of similar stops 12 13 and 12ª 13ª, respectively, shown in the foregoing forms. The spacing-dog is cammed back by a lever pivoted to the frame and connected with the universal bar, as will be hereinafter fully described. The parts are returned to normal position by a spring 6$^b$, attached to the universal bar and the frame of the machine.

Figure 17:
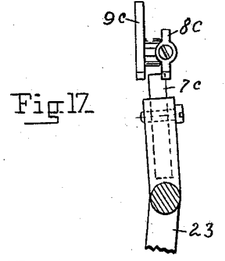
Figs. 17 and 18 show an adaptation of the invention to the "Caligraph" escapement.
Figure 18:
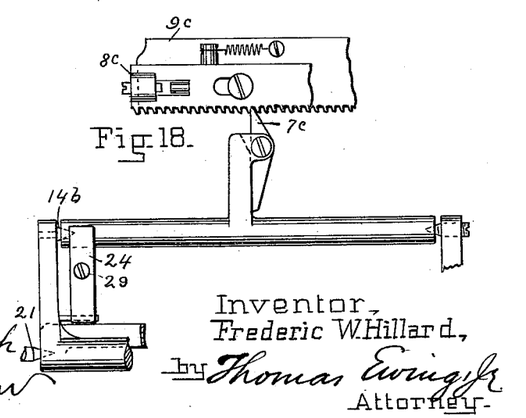

Figs. 17 and 18 show my invention applied to the Caligraph escapement, (described in United States patent to Walter J. Barron, No. 295,475, dated March 18, 1884.) The two racks 8$^c$ 9$^c$, one of which, 8$^c$, is reciprocating, co-operate with a single detaining-dog 7$^c$. The parts of the rocker-frame are not fully illustrated, because they are similar, with respect to the parts not shown, to the rocker-frame shown in Figs. 11 to 15. The parts of the rocker-frame of Figs. 17 and 18 are similar to those of the rocker-frame of Figs. 11 to 15 in the following respects—viz., as regards the two horizontal arms 20$^b$, the cross-beam 22, the pivots 21, the vertical arms 23, the pivots 14$^b$, the pair of springs 24, the screw 29, and the reversing-stops 12$^b$ 13$^b$.

Figures 14, 15, 16, 19:
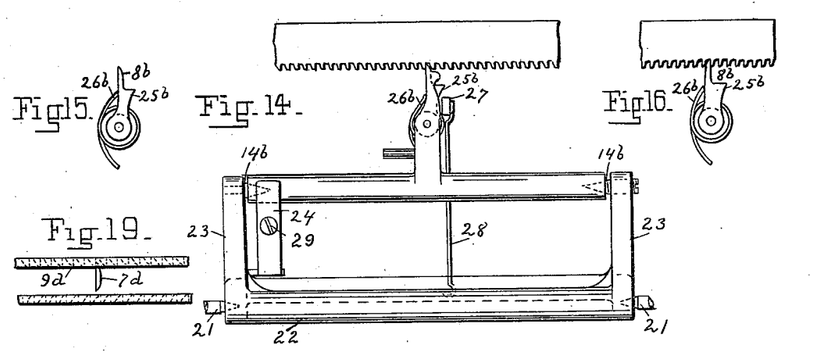

Fig. 19 illustrates an escapement comprising two racks in the same horizontal plane with the teeth of one rack facing those of the other rack. In this respect the construction is similar to that of the "Yost" escapement, (described in United States Patent No. 456,350, dated July 21, 1891,) excepting that the teeth of the two racks in my escapement are staggered with respect to each other. A single rigid dog plays between the two racks and may force the carriage forward by its impact on the faces of the teeth. The dog 7$^d$ normally engages with the front rack 9$^d$ and is rocked over into engagement with the rear rack on depression of a key, as in the Yost escapement. Hence the two horizontal arms on the rocker-frame, (not shown,) corresponding to the arms 20$^b$ of Figs. 11 to 15, should extend rearwardly from the rocker-frame, instead of forwardly, as in Figs. 11 to 15 and 17 and 18. Otherwise the rocker-frame comprises parts similar to the following parts in the rocker-frame of Figs. 11 to 15—viz., the cross-beam 22, the pivots 21, the two vertical arms 23, the pivots 14$^b$, the pair of springs 24, the screw 29, and the reversing-stops 12$^b$ 13$^b$. The rack-engaging edges of the dog 7$^d$ of Fig. 19 are slightly different as to shape from those of the dog 7$^c$ of Figs. 17 and 18, as shown. The friction-joint in the rocker-frame should be tensioned up sufficiently to drive the carriage forward without yielding, and should only yield when the upper part of the rocker-frame is engaged by the reversing-stops.

I have described the devices for camming back the spacing-dog very briefly, as the customary spring will serve the purpose in each of the foregoing forms, and because these devices are not essential to the operation of the escapement, as above indicated.

The cam 25 (shown in Figs. 1 to 4) is fixed to the frame of the machine, and is so placed as to engage the spacing-dog immediately on its passing out of mesh with the rack, whereby the dog is thrown back positively opposite the next succeeding tooth against the force of the spring 26.

Figure 8:
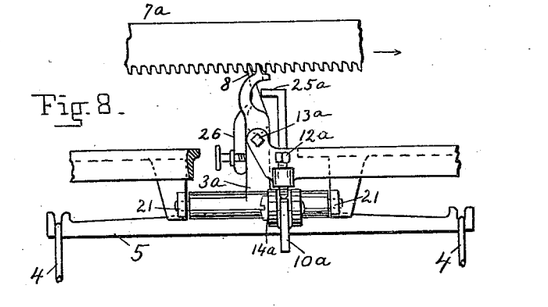
Fig. 8 is a back view of the modification shown in Figs. 5, 6, and 7, the position of the parts being that of Fig. 7.

In Figs. 5 to 8 the cam 25ª is carried by the upwardly-extending branch of the three-branched part of the rocker-frame, the point at which the cam-surface commences being marked by a line. The cam-surface extends from this line to the left to the end of the arm. The cam should engage with the spacing-dog to push and hold it back against the force of the spring 26 opposite the next succeeding tooth of the rack until the spacing-dog again enters the rack. The cam-surface to the left of the line spaces the dog backward into position to enter the succeeding rack-tooth, where it is held either by the cam-surface to the left of the line or by the plane surface to the right of the line against the force of the spring until it enters the rack. Fig. 8 shows the dog spaced to the end of the cam-surface and held by the plane surface. These surfaces prevent the spring 26 from spacing the dog forward so long as the key is held down, but when the key is released the arm is withdrawn from in front of the dog, which is then spaced forward by the spring 26. The arm is normally out of the path of the dog and is interposed in the path of the dog when the dog is disengaged from the rack.

In Figs. 11 to 16 the cam 25$^b$ is on the front face of the spacing-dog, which is pushed and held back against the force of the spring 26$^b$ opposite the next succeeding tooth of the rack by a pivoted lever 27, connected with the universal bar by a rod 28. This lever is just long enough to engage the cam while the spacing-dog is out of engagement with the rack. The lever 27 is normally out of the path of the dog 8$^b$. On depression of a key it is positioned in the path of that dog, engaging first with the lower portion of the cam-surface 25$^b$, then traveling up that surface and camming the dog backward until it reaches the upper edge of the cam-surface, where it acts to hold the dog from being spaced forward by the spring 26$^b$ until the dog has entered the rack.

In Fig. 19 the cam is on the rack-engaging faces of the dog 7$^d$ and on the faces of the teeth of the two racks with which the dog alternately engages.

Of course the customary spring for spacing the spacing-dog backward can be used in conjunction with my cam, if desired, instead of the spring which I have shown to hold the spacing-dog in line with the detaining-dog.

It is obvious that with the impulse-spring on the rear face of the spacing-dog there is no imperative need of a mainspring, and Fig. 16 illustrates a form in which none is used. In this form it is not necessary to use a detaining-dog, since there is nothing to throw the carriage forward when the spacing-dog, on which bears the impulse-spring, is thrown out of engagement with it.

On depression of a key the dog 8$^b$ is disengaged from the rack and is cammed back and re-engaged with the rack in the succeeding tooth. On release of the key the rack is spaced forward by the spring 26$^b$ acting through the dog 8$^b$ on the rack. When the carriage has been spaced forward, it is necessary to stop it at the proper place to print the next letter. This is accomplished by making the dog so large that it entirely fills the blank space between the teeth. This dog therefore acts in a double capacity—i. e., it feeds the carriage forward and then stops it in the proper place. It will be observed that in Fig. 14, where a mainspring spaces the carriage, the dog does not entirely fill the blank tooth-space, and only engages with its front face, while in Fig. 16, where the mainspring is omitted, the dog entirely fills the blank space and engages with the rear face of the tooth as well as with its front face.

In Fig. 19, where the mainspring is dispensed with and the carriage spaced by the impact of the dog on the rack-teeth, the dog has to perform the same double function as in Fig. 16; but with this construction the dog cannot be made large enough to entirely fill the blank space between the teeth, because the racks lie so close together that the dog would not clear one rack before it began to space the other. Therefore momentum is utilized to drive the carriage through the latter part of the letter-space. Fig. 19 shows the normal engagement of the members. On depression of a key the dog 7$^d$ is disengaged from the rack 9$^d$ and engaged with the opposite rack, thus camming the rack member forward a part of the distance to be spaced. Then the dog is re-engaged with the rack 9$^d$, again camming the rack member forward; and then the rack member is advanced the remainder of the space by the momentum of the carriage, and is finally brought to rest by the engagement of the rear face of the dog and the tooth in the position shown.

It will be noticed that in the several designs of escapements the cam is variously located. Thus, for example, in Figs. 1 to 4 it is fixed to the frame of the machine; in Figs. 5 to 8 it is carried on an independently-pivoted arm on the rocker-frame; in Figs. 11 to 15 and in Fig. 16 the shank of the spacing-dog is formed into a cam, and in Fig. 19 the cams are on the engaging faces of the dog and the rack-teeth.

The number of parts which are cammed vary in the several escapements. In Figs. 1 to 4 the spacing-dog 8 and the spring 26 are cammed. Similarly in Figs. 5 to 8 and 11 to 15 and in Fig. 16 the spacing-dog and its spring are cammed. In Fig. 19 the rack member only is cammed. But there is another feature which must be taken into account in Figs. 1 to 4 and 5 to 8. It is that the rack member may be cammed back as well as the dog and spring, for, since the spacing-dog is cammed back while the key is being depressed, the lower the key is depressed the farther back the dog will be cammed. Therefore, in case the adjustment of the parts is such that the rack is let off from the detaining-dog onto the spacing-dog prior to the printing and before the key is fully depressed, it is obvious that the carriage cannot remain at rest, but must be either pulled forward by the propelling power or cammed back by the spacing-dog.

The rack will be pulled forward until it is brought into collision with the spacing-dog, and then it will be cammed back again in the opposite direction with the dog until the key is fully depressed, and on the release of the key the rack and dog will be spaced forward together by the propelling power. With the use of the quick or staccato blow, however, this camming of the rack member will not occur, for the carriage will then have very little time in which to start forward, and the key not being wholly depressed the dog will not be cammed back far enough to cam the rack. Hence the forward feed of the carriage will not be checked. This means for camming the carriage member of the escapement assures that if a key is depressed and then inadvertently held down, thus holding the type against the paper, there can be no detrimental feed of the carriage to blur the print, while, on the other hand, with the staccato blow the carriage can be started forward prior to the printing, thus securing additional time for the spacing.

Where in the claims I specify means for advancing the carriage through a part of the distance to be spaced, means to reverse the feed to retract the carriage, means to release the carriage, and means to advance it through the whole of the distance to be spaced, (and where I make use of other terms of similar import,) I wish it to be understood that the parts may be so adjusted that if a quick or staccato blow is struck on the key and the key only partially depressed the means to reverse the feed to retract the carriage will not be brought into action.

The feature of releasing the carriage so that the propelling power begins to feed it forward prior to the printing, and continues so to feed it during and after the printing, if a staccato blow is struck, but reversing its feed and spacing it backward if a legato blow is struck, I believe to be broadly new, and the feature of pulling the carriage in one direction by the propelling power and at the same time providing means for camming it in the opposite direction by the force of the blow on the key I believe to be broadly new, and the feature of providing the escapement with three elements, operated by the type-keys, one to detain the member which can be spaced step by step with respect to and under control of the other member with which it engages, one to permit of the feed of the spaced member by the propelling power, and one to cam the spaced member in a direction opposite to that in which it is fed by the propelling power, I believe to be broadly new.

The cam for spacing the escapement is applicable independently of my buckle-joint. Thus in Fig. 19 the buckle-joint may be omitted and the rack spaced by the cam alone. It is not necessary that the camming element and the spacing element and the detaining element should all be distinct parts. A single part may combine the functions of two or more of the elements. Thus in Fig. 16 the dog $8^b$ performs the function of spacing-dog and detaining-dog, and in Fig. 19 the dog $7^d$ performs the function of camming-dog and detaining-dog.

It will be seen that my invention includes broadly two fundamental inventions—viz., the buckle-joint and the cam for camming the carriage backward—each distinct from and independent of the other, but both co-operating together to accomplish the desired object. Through the instrumentality of the buckle-joint I am enabled to so adjust the let-off that it shall practically be simultaneous with the impact of the type on the paper. Therefore the carriage will not have moved sufficiently at the instant of printing to throw the letter out of its proper place in the print, and still the carriage will be fed forward during the whole interval between two impressions; but the difficulty here met is that the adjustment of the engaging members in the escapement must be very delicate; otherwise the let-off will either occur later than the impact of the type, thus making the feed slow, or else it will occur too soon, and then if the key is held down a ghost or blur will appear in the print, as it occurs with "reversed escapements;" and, moreover, no matter how delicate the adjustments in the engaging members may be, they will soon wear with use; but the cam, by controlling the carriage after the let-off has taken place, obviates both of the difficulties above mentioned and makes it possible to safely adjust the let-off to time simultaneously with the impact of the type on the paper.

I do not in the application of my invention for retracting the carriage in a direction opposite to that in which it is fed for printing wish to limit myself narrowly to the use of a cam for that purpose, since other elements can readily be substituted to perform the same function.

It is obvious from the foregoing description that the essential features of both the swinging-rack form and the jointed rocker-frame forms herein shown and described are the following:

First. There should be a spacing mechanism comprising at least two engaging members, which as herein shown are a dog member and a rack member, one of which (shown as the rack) can be spaced forward step by step with respect to and under control of the other, and at least one of which (shown in the jointed rocker-frame forms as the dog) is movable, so that they may be engaged and disengaged with each other. In the swinging-rack form the dog is movable out of engagement with the rack, and the rack is movable into engagement with the dog. The phrase "engaging and disengaging members" is used in a very general sense and is intended to include the case where one of the two members has two elements—as, for example, the two dogs of Figs. 1 to 4, or the two racks of Figs. 17 and 18, one of which can be moved in the line of feeding through the distance of one letter-space (as in all of the devices excepting Fig. 19) and the other member alternately engages with these elements. The term "engaging members," as used in the claims, designates the normal engagement of the members when the machine is at rest, and the term "disengaging members" designates the relation of the members opposite thereto. To illustrate, the members are in engagement in Figs. 2, 5, 11, 16, 17 and 19 and in disengagement in Figs. 3, 6 and 12. A distinction should be carefully noted between the phrase "a typewriter escapement comprising two engaging members which can be disengaged and re-engaged" and the phrases "engaging faces" and "two faces in the escapement in detaining engagement," for, as above noted, one of the engaging members is ordinarily provided with two or more faces which engage and disengage with the other member, one or more when the members are engaged or in their normal positions of rest, and the other or others when the members are disengaged or in the reverse positions designated above. The terms "rack member" and "dog member" are also used in a general sense, and I intend to include thereby the various forms of racks known in the art—as, for instance, single and double racks and straight and circular ones, or ratchet-wheels—as well as the great variety of dogs that are in use.

Second. There should be a joint in one of the members, which, in the swinging-rack form, is the joint on which the rack is hung, and in the jointed rocker-frame forms is the friction-joint in the rocker-frame. This joint permits of the buckling of two parts in the escapement during the movement of the key in one direction. The buckling or co-operating movement of the parts occurs in every instance. For example, in Figs. 1 to 4, when a key is depressed the rocker-frame is first vibrated toward the front of the machine, then as the depression of the key is continued the rack is vibrated toward the front of the machine, and, finally, on release of the key the rocker-frame and rack are vibrated together toward the back of the machine. Again, in Figs. 11 to 13, on depression of the key the rocker-frame is first vibrated as a whole toward the front of the machine, then as the depression of the key is continued the upper or dog carrying part of the rocker-frame is reversed and vibrated toward the rear, and, finally, on release of the key the two parts of the rocker-frame are returned to their normal positions together. Thus there are three transverse movements of the parts in the escapement while the key is being depressed and raised or while the key is moving in only two directions. Owing to this double action of the engaging members, while the key is being depressed, I can time the let-off to occur simultaneously with the impact of the type on the paper, and it is immaterial whether the spacing element or the detaining element or whether any element be normally engaged with the spaced member. Thus in Fig. 2 the face of the spacing-dog is normally in engagement, in Fig. 16 both the spacing and the detaining faces of the dog are normally in engagement, and in Fig. 19 the detaining-face only is in engagement. My invention does not concern itself with the normal engagement when the machine is at rest, but only with the let-off, and it may be employed with escapements regardless of their normal engagements and with any forms of normal engagements known to the art, the object of the invention being, as stated above, to so time and control the let-off of the carriage for spacing as to give the largest possible amount of time for the letter-space feed consistent with safety. The two parts which form the buckle-joint in the escapement must be carefully distinguished from the two engaging members. I have shown in the drawings escapements with my buckle-joint which have a variety of engaging members, and my buckle-joint may be used with any of the forms of engaging members known to the art. My escapement has, broadly, four elements—viz., two engaging members and two parts which form the buckle-joint. The parts that form the engaging members may be identical with those which form the buckle-joint, as in Figs. 1 to 4, or they may be different, as in Figs. 11 to 14, where the buckle-joint is wholly in one of the members. The buckle-joint may be composed of two parts hinged together, as in Figs. 11 to 14, or they may be parts that are not actually hinged together, but which engage with one another and move like the parts of a buckle during the act of engaging and disengaging, as in Figs. 1 to 4. In this latter case the buckle-joint can be partially or wholly broken during some stage of the movements of the parts. It should be further noted that the parts which form the buckle-joint in the escapement are in each case both rocked simultaneously to effect the buckling, but that one part is rocked in a direction which by mechanical usage is designated as a "right-handed" direction, while the other is rocked in the opposite or left-handed direction; or, in other words, one part is rocked in the direction in which the hands of a clock move around the face of the dial and the other part is rocked in a direction opposite to that in which the hands move around the dial. This rocking of one part in a right-handed direction, while the other part is simultaneously rocking in a left-handed direction, causes the paths traversed by the faces of the engaging members to change and cut across one another during the movement necessary to effect the spacing. Thus the lines of wear caused by the rubbing of the dogs across the rack-teeth, which ordinarily appear in machines that have been in use for a considerable time, are constantly being rubbed out in my escapement, so much so that the action of the keys becomes perceptibly smoother after a new machine has been run but a few days.

Third. There should be means for effecting the disengagement of the members—that is, of the rack and the dog with which it normally engages, whether it be a spacing-dog or a detaining-dog—including means for controlling the joint while the disengagement is being effected. If the rack and dog are normally disengaged while the machine is at rest, the disengagement takes place at the end of the stroke instead of at the beginning. The actuating means for disengaging the engaging members are the keys and the connecting mechanism; but unless there be included, broadly, some means—as, say, a friction or lock—to hold the joint of the rack or rocker frame inoperative while the whole rocker-frame is swung, or pushing-points to drive the teeth of the rack faster than the dogs are vibrated, or stops to swing the dogs on the friction-joint of the rocker-frame in one direction while the lower part of the rocker-frame is being swung in the opposite direction, the operation of the keys would not effect the disengagement of the dog and rack.

Fourth. There should be some means for operating the joint to effect the re-engagement of the members, as the point in the swinging-rack form which pushes the rack onto the spacing-dog or the stops in the jointed rocker-frame forms which cause the buckling at the friction-joints of their frames, and hence effect the return of the spacing-dog into engagement with the rack.

Fifth. There should be means for effecting the spacing by aid of these movements, whether by stepping the rack forward by impact of the rack and dog or by other devices indicated or now known.

Sixth. Since these movements leave the parts buckled—as, for instance, the rack swung in toward the machine or the rocker-frame buckled at its friction-joint—there should be some means for re-establishing the normal position of the parts.

In the combinations claimed, in which the part which reciprocates in the line of the carriage-feed is specified—as, for instance, the spacing-dog of Figs. 1 to 4 or the spacing-rack of Figs. 17 and 18—this, as well as the parts just enumerated, must be returned to normal position after the release of the type-key.

By the term "keys" I mean to include the whole collective body of keys which are manipulated by the operator to effect the step-by-step spacing of the carriage. This term includes the set of type-keys and one or more space-keys or keys which effect the step-by-step spacing of the carriage, but do not operate the type to print. By the term "type-keys" I mean the set of keys which are manipulated to effect the step-by-step spacing of the carriage and also to operate the type to effect printing.

Some of the more important advantages which I secure by buckling and camming the parts in the escapement are the following, viz:

First. I can release the carriage at the instant of printing, and I can re-engage the members, which are normally in engagement when the machine is at rest, at any desired part of the stroke.

Second. By buckling the parts while depressing the type-key I can cam a reciprocating element—as, say, the spacing-dog—backward and engage it with its complementary member—as, say, the rack—at a different tooth than the one from which it was disengaged. One advantage of thus camming back the reciprocating element is the fact that if the let-off occurs before the impact of the type on the platen the carriage is prevented from feeding forward until after the printing, thus obviating the danger of blurring the print; and in case the carriage has started to feed forward it will be returned to its first position or starting-point prior to the printing, thus bringing the letter in its proper place in the print. Another advantage of camming this element back is the fact that the power required to space it back at different speeds becomes self-regulating. Where the ordinary spring is employed to space the dog backward a spring of the lightest possible tension is used, so that the touch on the keys may be kept as light as possible; but when great speed is required, the spacing-spring must be tensioned up considerably more, so as to space the dog back in the shortest time. By employing a cam this difficulty is avoided, as the key cannot be depressed without spacing the dog. Still another advantage is the fact that with the cam the force of the spacing-spring on the dog co-operates with the mainspring to feed the carriage forward, instead of opposing it, as the ordinary spring does. Therefore the speed of the carriage-feed will be increased.

Third. In machines which dispense with mainsprings, the carriage may be normally out of the control of the escapement and free to be retracted for a new line of print without the depression of a space-key, the spacing-dog being engaged with the rack simultaneously with the impression of the type on the paper, and then spaced forward by its spring with the rack, and then disengaged from the rack at the end of the stroke.

Where, in the claims, I say that the working faces of the cams are oblique to the direction of the carriage-feed, I mean to include rounded faces (as, say, those in Fig. 19) as well as flat ones.

Where, in the claims, I use the term "movable transversely," I mean to include any movement transverse to the line of print. In this application the escapements which I show reciprocate transversely toward the front and back of the machine, but they may move transversely in any other direction, as, say, up and down. Escapements having such transverse movements are well known in the art. I do not show them in this application because they form no part of this invention; but this invention is applicable to all such escapements.

Where, in the claims, I specify means for spacing one member of the escapement by the impact of the other member, I mean to include spacing it back to its position at the beginning of the stroke, or in other words spacing it back to its first position, as well as spacing it forward. Thus, in Figs. 1 to 4, when a legato blow is struck, the carriage may be pulled forward by the mainspring, and then back to its first position by the impact of the dog.

By "spaced element" I mean the carriage, or a part connected thereto and moving therewith.

I do not intend to limit myself to the details shown, and particularly I do not limit myself to combining my friction-joint or my carriage-retracting mechanism with any particular let-off mechanism; nor, in the jointed rocker-frame form of my invention do I limit myself to holding the joint inoperative so as to effect the disengagement of the members.

I do not in this application make any claim specifically to the mechanism shown in Figs. 1 to 4 and 9 and 10, nor to any swinging-rack form of escapement, nor to any other form of escapement comprising two engaging members in which a member of the escapement is moved transversely to effect the engagement or disengagement of the members, and also travels forward step by step relatively to the other member in the operation of spacing, and the swinging-rack form is merely shown herein to present adequately the full scope of my invention. I claim these forms in my other application for type-writer escapements, filed January 9, 1893, Serial No. 457,800. Nor do I in this application make any claim specifically to an escapement having the faces of its engaging members oblique to the direction of the carriage-feed. I claim this in my other applications, Serial No. 457,800, above mentioned, and Serial No. 511,685, filed May 18, 1894.

In Figs. 9 and 10 I have shown a lock to hold the jointed member of the escapement from buckling at its joint while the disengagement is being effected; but I do not in this application claim a lock for holding the joint inoperative. I claim this in my other application, Serial No. 457,800, above mentioned.

Without limiting myself to the precise form of devices shown, what I claim, and desire to secure by Letters Patent, is—

1. In a type-writer escapement, the combination of two engaging members which can be disengaged and re-engaged, one of which can be spaced step by step with respect to and under control of the other, two parts which together form a buckle in one of the engaging members, means for buckling the two parts simultaneously, one in a right-handed direction and the other in a left-handed direction, means for restoring the buckle to its original position, whereby the said engaging members are disengaged and re-engaged and the spacing thereby effected, substantially as described.

2. In a type-writer escapement, the combination of two engaging members which can be disengaged and re-engaged, one of which can be spaced step by step with respect to and under control of the other, two parts which together form a buckle in one of the engaging members, means for buckling the two parts transversely and simultaneously, one in a right-handed direction and the other in a left-handed direction, means for restoring the buckle to its original position whereby the said engaging members are disengaged and re-engaged and the spacing thereby effected, substantially as described.

3. In a type-writer escapement, the combination of spacing mechanism comprising two engaging members which can be disengaged and re-engaged and one of which can be spaced step by step with respect to and under control of the other, a joint in one of the members, means for effecting the disengagement of the members including means for controlling the joint while the disengagement is being effected, means for operating the joint to effect the re-engagement of the members, all for effecting the spacing by aid of these movements, and means for re-establishing the normal position of the parts, substantially as described.

4. In a type-writer escapement, the combination of spacing mechanism comprising two engaging members which can be disengaged and re-engaged, one of which is jointed and can be moved out of and into engagement with the other, and the other of which can be spaced with respect to the first, means for effecting the disengagement of the members including means for controlling the joint while the disengagement is being effected, means for operating the joint to effect the re-engagement of the members, all for effecting the spacing by aid of these movements, and means for re-establishing the normal position of the parts at the joint of the jointed member, substantially as described.

5. In a type-writer escapement, the combination of spacing mechanism comprising two engaging members which can be disengaged and re-engaged, one of which is jointed and can be moved out of and into engagement with the other, and the other of which can be spaced with respect to the first, means for effecting the disengagement of the members including means for holding the joint inoperative while the disengagement is being effected, means for operating the joint to effect the re-engagement of the members, all for effecting the spacing by aid of these movements, and means for re-establishing the normal position of the parts at the joint of the jointed member, substantially as described.

6. In a type-writer escapement, the combination of a rack member and a dog member, one of which is provided with a reciprocating part which engages with the other member, means for effecting the disengagement of the reciprocating part from the other member, a cam to operate the reciprocating part while disengaged, all for effecting the spacing by aid of these movements, and means to return the reciprocating part to normal position, substantially as described.

7. In a type-writer escapement, the combination of a rack member and a dog member, one of which is provided with a reciprocating part which engages with the other member, and one of which can be spaced with respect to the other member, a joint in one of the members, means for effecting the disengagement of the reciprocating part including means for controlling the joint while the disengagement is being effected, a cam to operate the reciprocating part while disengaged, means for operating the joint to effect its re-engagement, all for effecting the spacing by aid of these movements, and means for reestablishing the normal position of all the parts, substantially as described.

8. In a type-writer escapement, the combination of a rack member that can be spaced forward with respect to a dog, a dog member that can be reciprocated with respect to the rack, means for disengaging them, a cam for moving the dog when disengaged from the rack into position to engage with a succeeding tooth thereof, means for re-engaging them, means for releasing the dog from the cam, and a spring acting on the dog to space it and the rack member forward when released from the cam, substantially as described.

9. In a type-writer escapement, two engaging and disengaging members, one of which can be spaced forward step by step with respect to and under control of the other, and means for spacing the first-mentioned member backward by the impact of the said other member, substantially as described.

10. In a type-writer escapement, the combination of a rack which can be spaced forward step by step with respect to and under control of a dog, and means for spacing the rack backward by the impact of the dog, substantially as described.

11. In a type-writer escapement, the combination of a rack which can be spaced forward step by step with respect to and under control of a dog, means for disengaging the dog from the rack, means for spacing the dog backward while disengaged from the rack and for spacing the rack backward by the impact of the dog, and means for spacing the dog and rack forward together, substantially as described.

12. In a type-writer, the combination of a carriage, carriage-propelling power, and an escapement comprising a rack member and a dog member, one of which members is provided with a reciprocating part which engages with the other member, means for advancing the carriage step by step by the force of the propelling power, which means include a cam for spacing the reciprocating part in the opposite direction, substantially as described.

13. In a type-writer, the combination of a carriage, carriage-propelling power, and an escapement comprising a rack member and a dog member, one of which members is provided with a reciprocating part which engages with the other member, means for advancing the carriage step by step by the force of the propelling power, which means include a cam having a working face oblique to the direction of the carriage-feed for spacing the reciprocating part in a direction opposite to that in which the carriage is spaced by the propelling power, substantially as described.

14. In a type-writer, the combination of a carriage, carriage-propelling power, and an escapement comprising a rack member and a dog member, one of which members is provided with a spacing-dog which engages with the rack, means for advancing the carriage step by step by the force of the propelling power, which means include a cam for spacing the spacing-dog in the opposite direction, substantially as described.

15. In a type-writer, the combination of a carriage, carriage-propelling power, and an escapement comprising a rack member and a dog member, one of which members is provided with a spacing-dog which engages with the rack, means for advancing the carriage step by step by the force of the propelling power, which means include a cam having a working face oblique to the direction of the carriage-feed for spacing the spacing-dog in a direction opposite to that in which the carriage is spaced by the propelling power, substantially as described.

16. In a type-writer escapement operated by the type-keys and comprising two engaging members which can be disengaged and re-engaged and one of which can be spaced step by step with respect to and under control of the other, the combination of two faces in detaining engagement, means for disengaging them, means for advancing the spaced member, means to retract the spaced member and to release it, substantially as described.

17. In a type-writer, the combination of a carriage, and an escapement comprising two engaging members which can be disengaged and re-engaged, two faces in the escapement in detaining engagement, means for disengaging them, means for advancing the spaced member, means to retract the spaced member and to release it, substantially as described.

18. In a type-writer escapement, in which one member is spaced by propelling power with respect to and under control of another member with which it engages, the combination of a detaining element to hold the spaced member stationary against the force of the propelling power, a cam spacing element to permit the spaced member to be advanced step by step by the propelling power, and to retract the spaced member, the spacing element and propelling power being operated by the stroke on the type-keys, substantially as described.

19. In a type-writer escapement, in which one member is spaced by propelling power with respect to and under control of another member with which it engages, the combination of a detaining element to hold the spaced member stationary against the force of the propelling power, a cam spacing element to permit the spaced member to be advanced step by step by the propelling power, and to retract the spaced member to return it to the first position, the spacing element and propelling power being operated by the stroke on the type-keys, substantially as described.

20. In a type-writer escapement, which is operated by the type-keys and in which a member is spaced step by step by propelling power, with respect to and under control of another member with which it engages, the combination of a detaining element to hold the spaced member stationary against the force of the propelling power, a cam spacing element to permit the spaced member to be advanced step by step by the propelling power, and to retract the spaced member by the force of the blow on the key, the spacing element and propelling power being operated by the stroke on the type-keys, substantially as described.

21. In a type-writer escapement, which is operated by the type-keys and in which a member is spaced step by step by propelling power, with respect to and under control of another member with which it engages, the combination of a detaining element to hold the spaced member stationary against the force of the propelling power, a cam spacing element to permit the spaced member to be advanced step by step by the propelling power, and to retract the spaced member to return it to the first position by the force of the blow on the type-keys, the spacing element and propelling power being operated by the stroke on the type-keys, substantially as described.

22. In a type-writing machine, the combination of a carriage, carriage-propelling power, a key, and an escapement comprising two engaging members one of which can be spaced forward step by step and one of which contains a spacing element and a detaining element, means for spacing the carriage forward by the propelling power, a spring to space the spacing element forward, and means to limit the forward movement of the spacing element and to move it backward, said means being operated by the keys, substantially as described.

23. In a type-writing machine, the combination of a carriage, a carriage mainspring, a key, and an escapement comprising a rack member which can be spaced forward step by step and a dog member which engages therewith and contains a spacing-dog and a detaining-dog, means for spacing the carriage forward by the mainspring, a spring to space the spacing-dog forward, and means to limit the forward movement of the spacing-dog and to move it backward, said means being operated by the keys, substantially as described.

24. In a type-writer escapement, the combination of a dog-carrying rocker-frame and a reciprocating dog having a limited movement mounted thereon, a spring on the rocker-frame which spaces the dog normally forward, and means for spacing the dog backward, substantially as described.

25. In a type-writer escapement, the combination of a dog-carrying rocker-frame and a reciprocating dog having a limited movement mounted thereon, a spring on the rocker-frame which spaces the dog normally forward, and a cam for spacing the dog backward, substantially as described.

26. In a type-writer escapement, the combination of a rack member which can be spaced forward step by step and a dog member which engages therewith and comprises a rocker-frame and a spacing-dog mounted thereon, means for disengaging the dog from the rack, means normally out of the path of the dog which can be interposed in its path to space the dog backward and to control it in position to engage with a succeeding rack-tooth, and a spring on the rocker-frame to space the dog forward, substantially as described.

27. In a type-writer escapement, the combination of a rack member which can be spaced forward step by step and a dog member which engages therewith and comprises a rocker-frame and a spacing-dog mounted thereon, means for disengaging the dog from the rack, a cam normally out of the path of the dog which can be interposed in its path to space the dog backward and to control it in position to engage with a succeeding rack-tooth, and a spring on rocker-frame to space the dog forward, substantially as described.

Subscribed by me, at Tottenville, New York, this 10th day of May, 1892.

FREDERIC W. HILLARD.

In presence of—
 BENJAMIN WILLIAMS,
 WALKER WASHINGTON.